US012347963B2

(12) United States Patent
Chen

(10) Patent No.: US 12,347,963 B2
(45) Date of Patent: Jul. 1, 2025

(54) ELECTRICAL CONNECTOR ASSEMBLY HAVING A METAL PLATE FOR MOUNTING A CONNECTOR TO A HOUSING

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Ming-Ching Chen, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 335 days.

(21) Appl. No.: 18/153,599

(22) Filed: Jan. 12, 2023

(65) Prior Publication Data

US 2023/0238732 A1 Jul. 27, 2023

(30) Foreign Application Priority Data

Jan. 22, 2022 (CN) ........................ 202220172109.3

(51) Int. Cl.

*H01R 13/512* (2006.01)
*H01R 24/38* (2011.01)
*H01R 103/00* (2006.01)

(52) U.S. Cl.

CPC .......... *H01R 13/512* (2013.01); *H01R 24/38* (2013.01); *H01R 2103/00* (2013.01)

(58) Field of Classification Search

None

See application file for complete search history.

(56) References Cited

U.S. PATENT DOCUMENTS

| | | | | |
|---|---|---|---|---|
| 10,205,285 | B2 * | 2/2019 | Sasaki | H04N 23/57 |
| 11,569,611 | B2 * | 1/2023 | Inoue | H01R 13/6271 |
| 2020/0099168 | A1 | 3/2020 | Inoue et al. | |
| 2021/0313746 | A1 * | 10/2021 | Kato | H01R 13/6215 |

FOREIGN PATENT DOCUMENTS

| | | | | |
|---|---|---|---|---|
| CN | 109599725 A * | 4/2019 | | B60R 11/04 |
| JP | 2015170515 A | 9/2015 | | |
| WO | WO-2022004101 A1 * | 1/2022 | | |

* cited by examiner

*Primary Examiner* — Tho D Ta

(74) *Attorney, Agent, or Firm* — Ming Chieh Chang

(57) ABSTRACT

An electrical connector assembly includes: a housing having a base, a body extending rearward from the base, and a hole through the base and the body, the hole including a first part of a first diameter, a second part of a second diameter greater than the first diameter, and a step portion between the first part and the second part; a connector received by the housing, the connector having an insulating member, an inner conductor, and an outer conductor received by the first part of the hole, the outer conductor having plural tabs received by the second part of the hole; and a metal plate confining the tabs to the second part of the hole.

7 Claims, 13 Drawing Sheets

ELECTRICAL CONNECTOR ASSEMBLY HAVING A METAL PLATE FOR MOUNTING A CONNECTOR TO A HOUSING

BACKGROUND OF THE INVENTION

1. Field of the Invention

The present invention relates to an electrical connector including a housing having a hole and a connector received by the housing and having an insulating member, an inner conductor, and an outer conductor received by the hole, wherein the outer conductor has a plurality of tabs received by and confined to the hole.

2. Description of Related Art

Japan Patent No. 2015170515 discloses a connector assembly including a housing made of resin to be easily manufactured and casing made of metal to achieve higher strength and higher shielding performance. U.S. Patent Application Publication No. 2020/0099168 discloses an improved connector assembly ensuring a connector to be fixed to a connector housing with high water-tightness, free of damaging or breaking due to external force, and achieving high shielding performance and reliability. The connector includes a conductive terminal, an intermediate insulating member retaining the terminal, and an outer conductor that is conductive and contains the intermediate insulating member. The connector housing includes an outer conductor holding part provided with an outer conductor insertion hole through which the outer conductor is inserted and a front outer conductor containing cavity that is formed on a front side of the outer conductor holding part and has a larger cross-sectional area than the outer conductor insertion hole. The connector is fixed to the connector housing with a tab welded to a front surface of the outer conductor holding part, the tab being integrally formed with the outer conductor, and with a potting material filled in a portion in the front outer conductor containing cavity close to the front surface of the outer conductor holding part.

SUMMARY OF THE INVENTION

An electrical connector assembly comprises: a housing having a base, a body extending rearward from the base, and a hole through the base and the body, the hole including a first part of a first diameter, a second part of a second diameter greater than the first diameter, and a step portion between the first part and the second part; a connector received by the housing, the connector having an insulating member, an inner conductor, and an outer conductor received by the first part of the hole, the outer conductor having a plurality of tabs received by the second part of the hole; and a metal plate confining the plurality of tabs to the second part of the hole.

DETAILED DESCRIPTION OF THE PREFERRED EMBODIMENT

Figure 1:
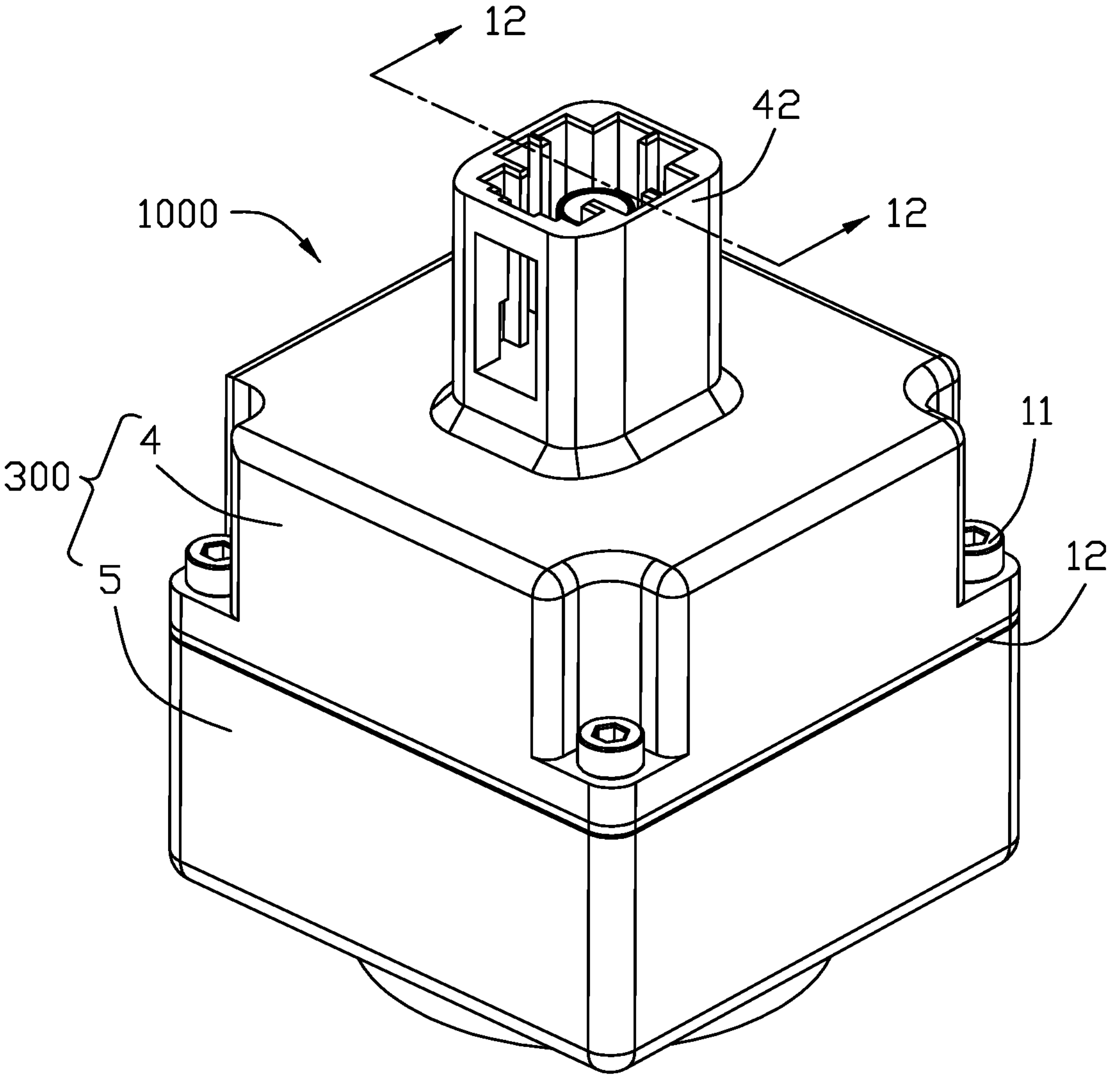
FIG. 1 is a bottom perspective view of an electrical connector assembly in accordance with the present invention.
Figure 2:
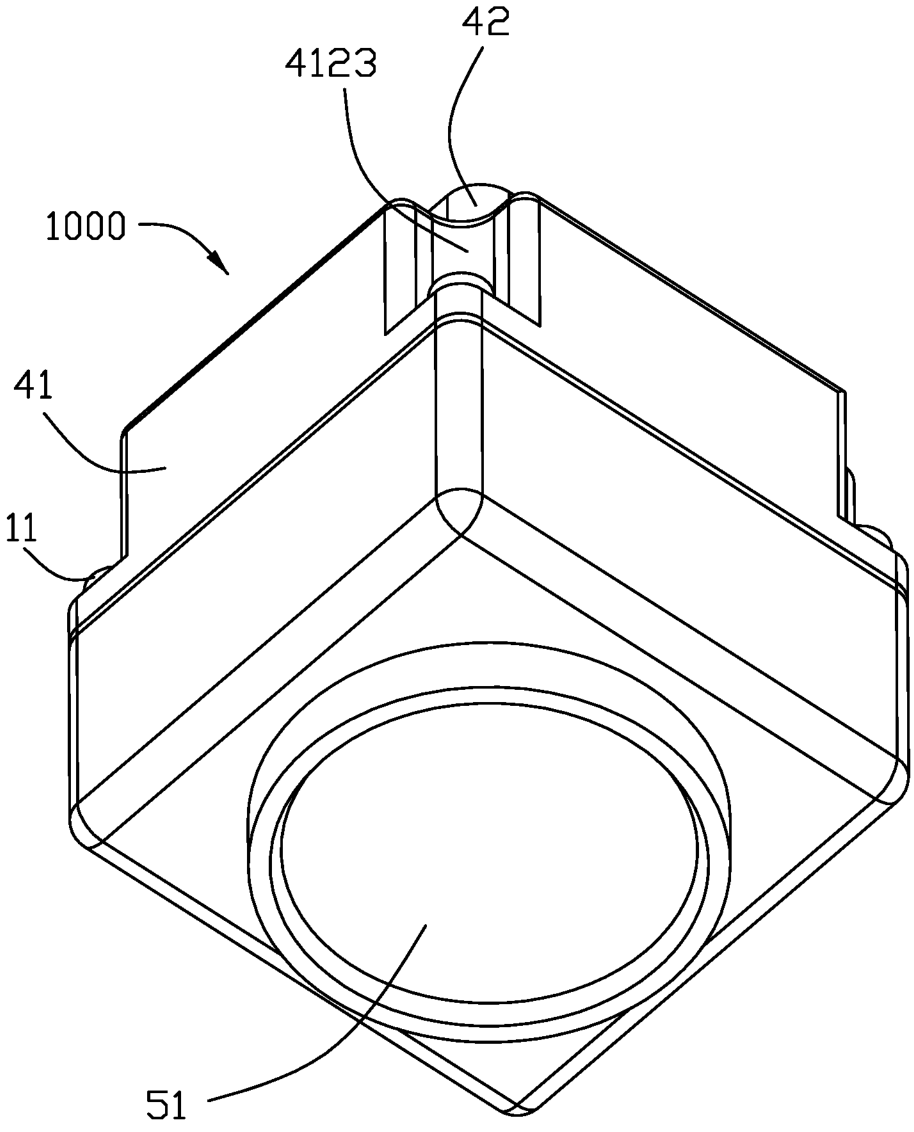
FIG. 2 is another perspective view of the electrical connector assembly.
Figure 3:
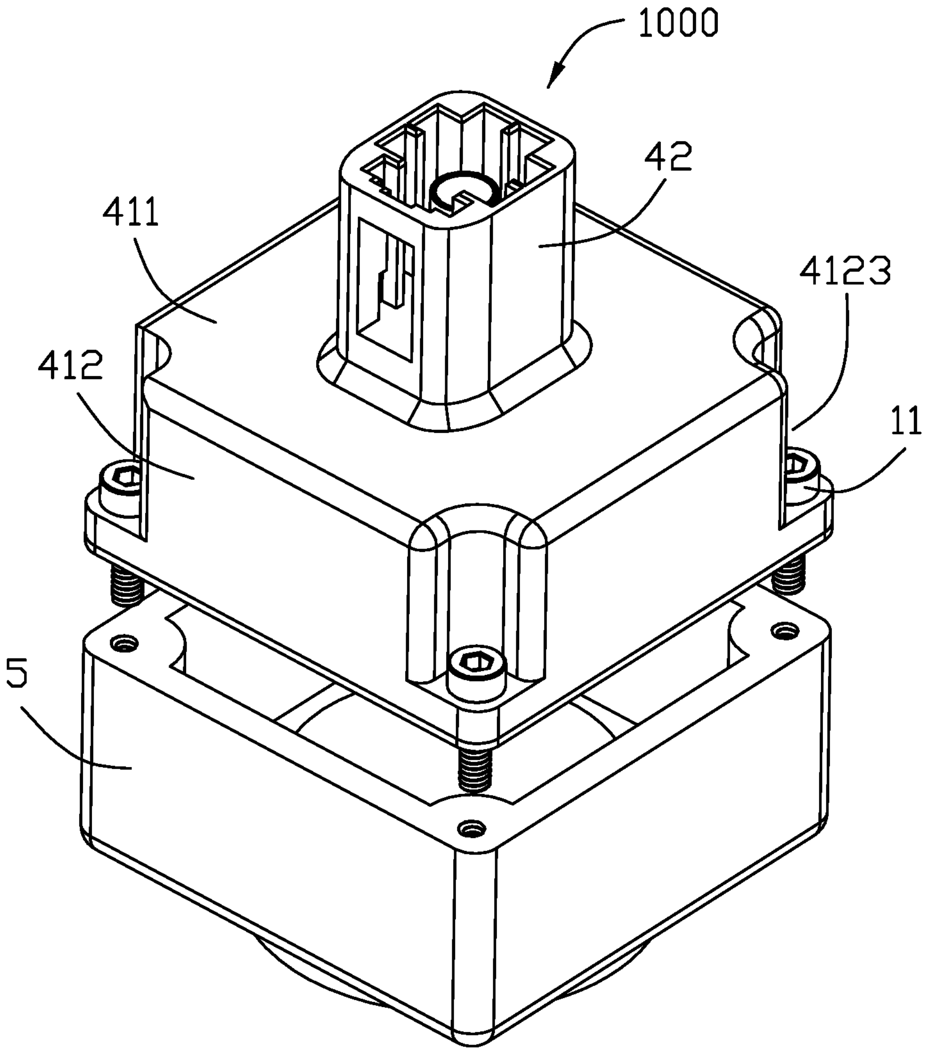
FIG. 3 is a partially exploded view of the electrical connector assembly.
Figure 4:
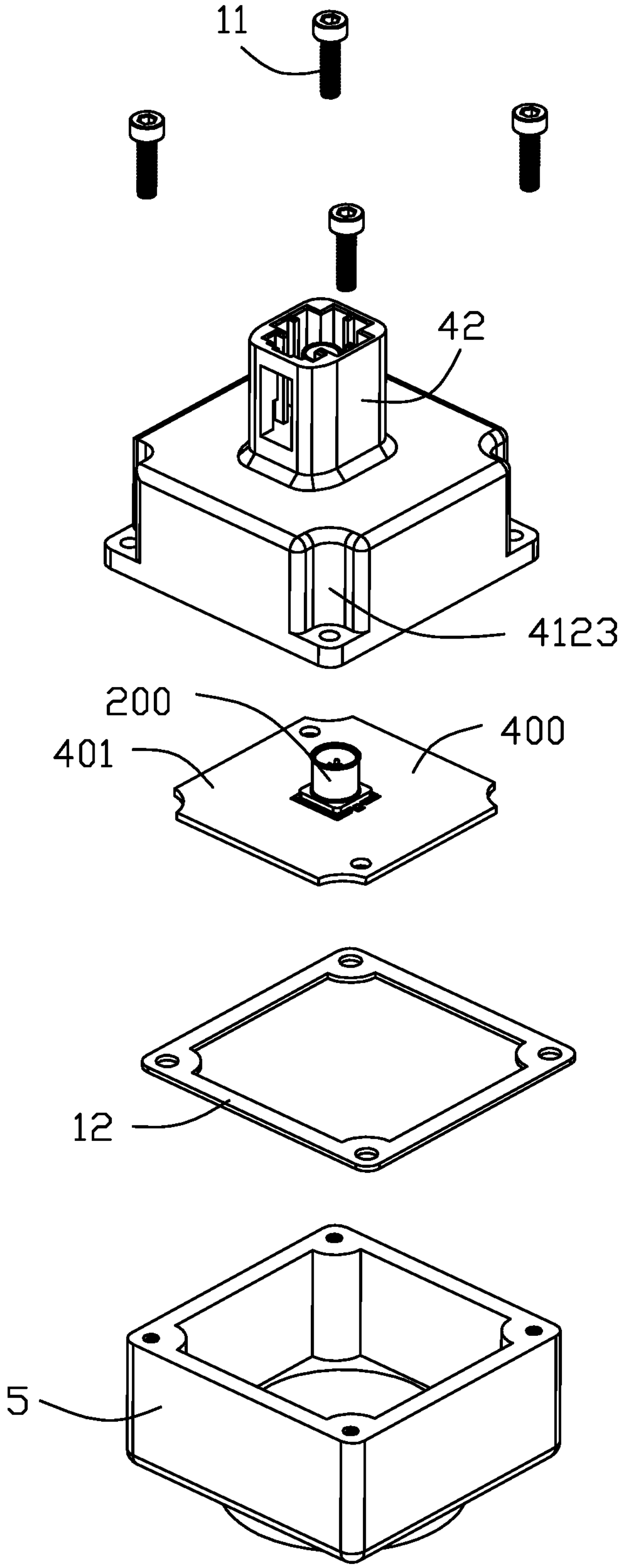
FIG. 4 is a further exploded view of the electrical connector assembly.
Figure 5:
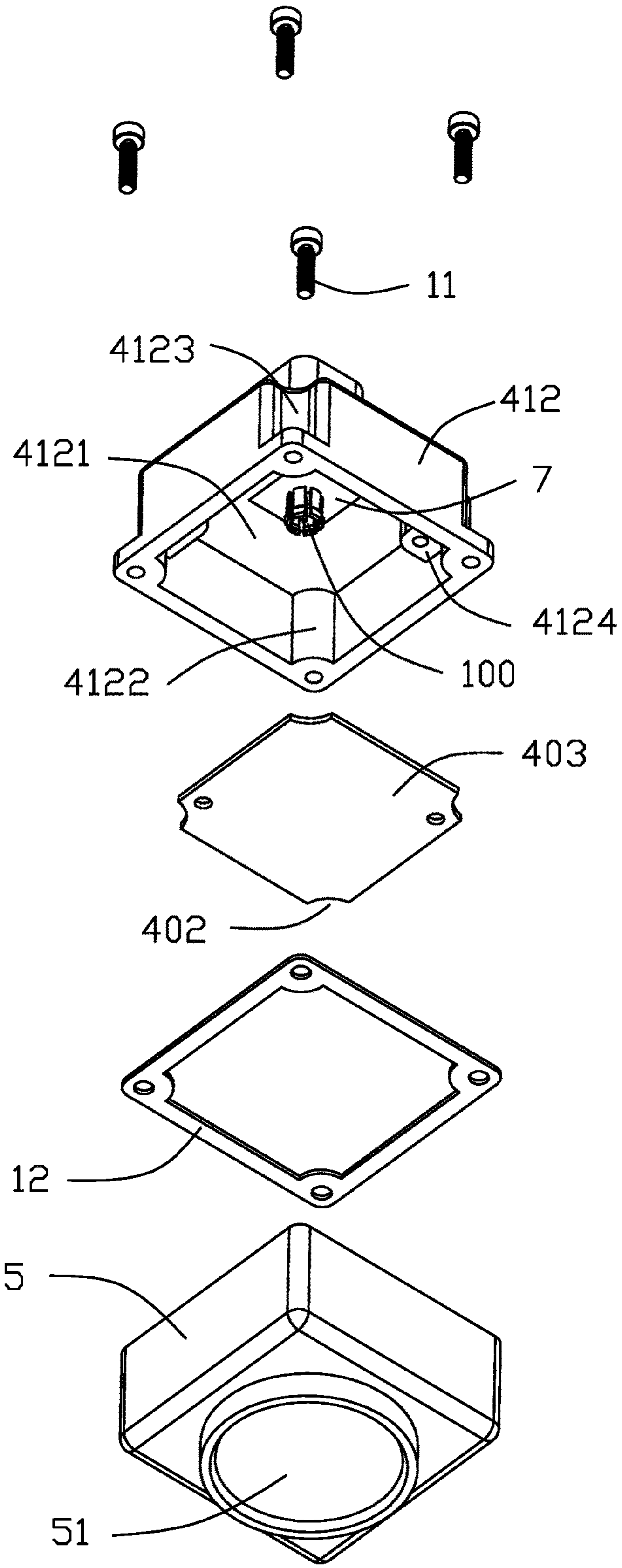
FIG. 5 is a view similar to FIG. 4 but from another perspective.
Figure 6:
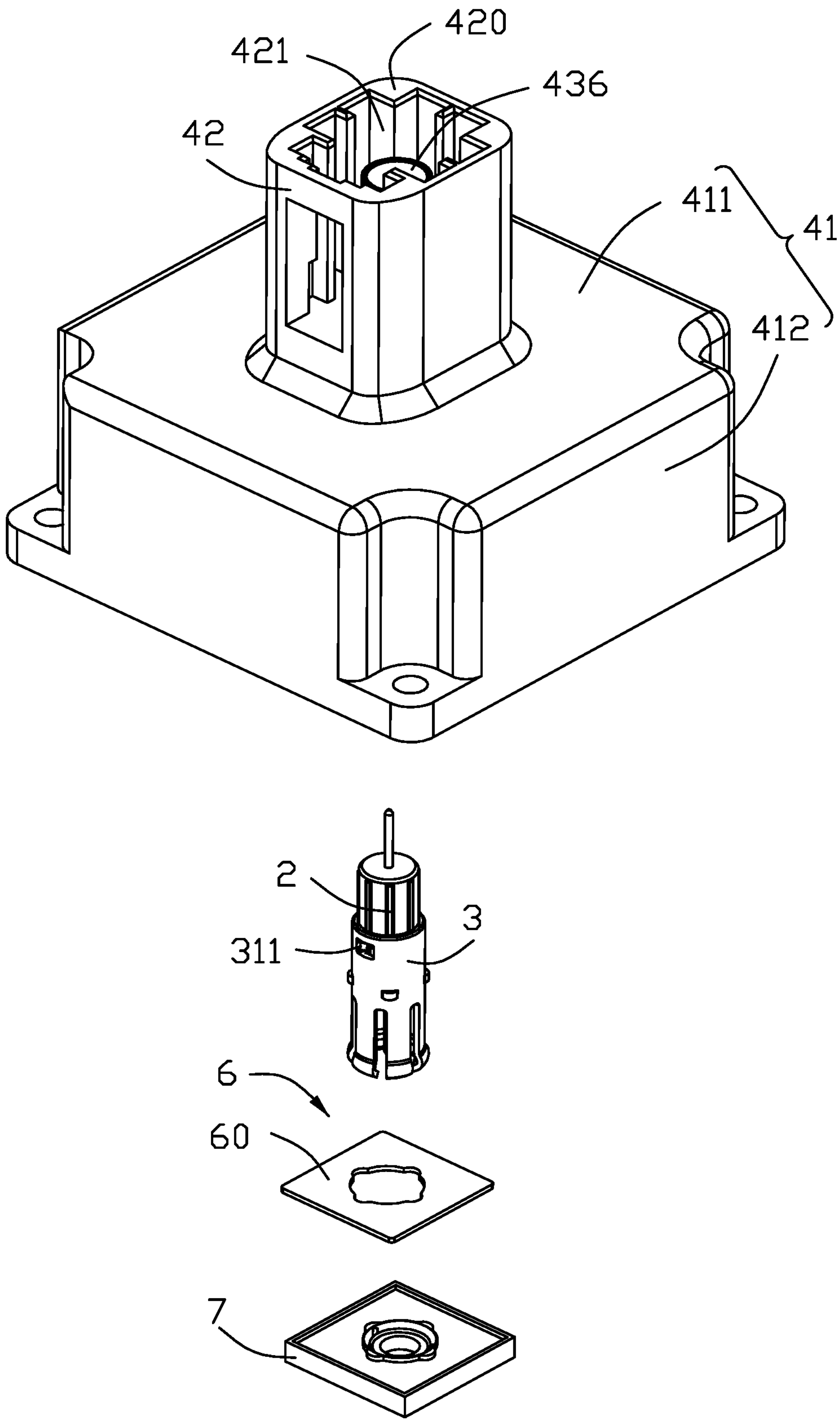
FIG. 6 is an exploded view of a part of the electrical connector assembly.
Figure 7:
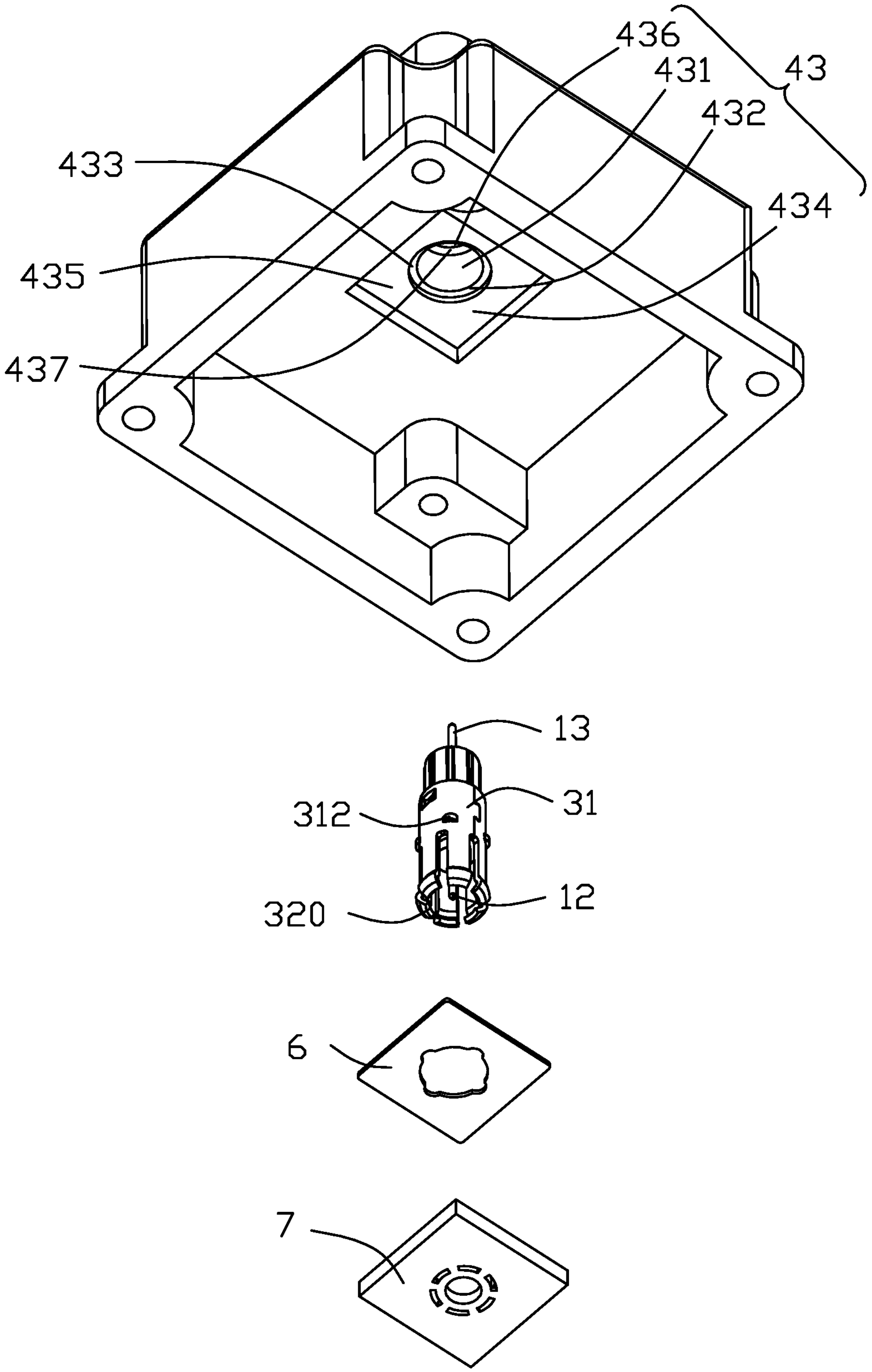
FIG. 7 is a view similar to FIG. 6 but from another perspective.

Referring to FIGS. 1-13, an electrical connector assembly 1000 includes a housing 4 and an electrical connector 100 received by the housing 4, which in practical use is coupled to a module including a casing 5, a light entering structure 51, a substrate 400, and a module side connector 200 mounted on the substrate 400. The housing 4 is coupled to the casing 5 through fasteners 11 and seal 12 to constitute a cover 300. Since the module itself is generally of a well known construction, it will not be described in detail.

Figure 8:
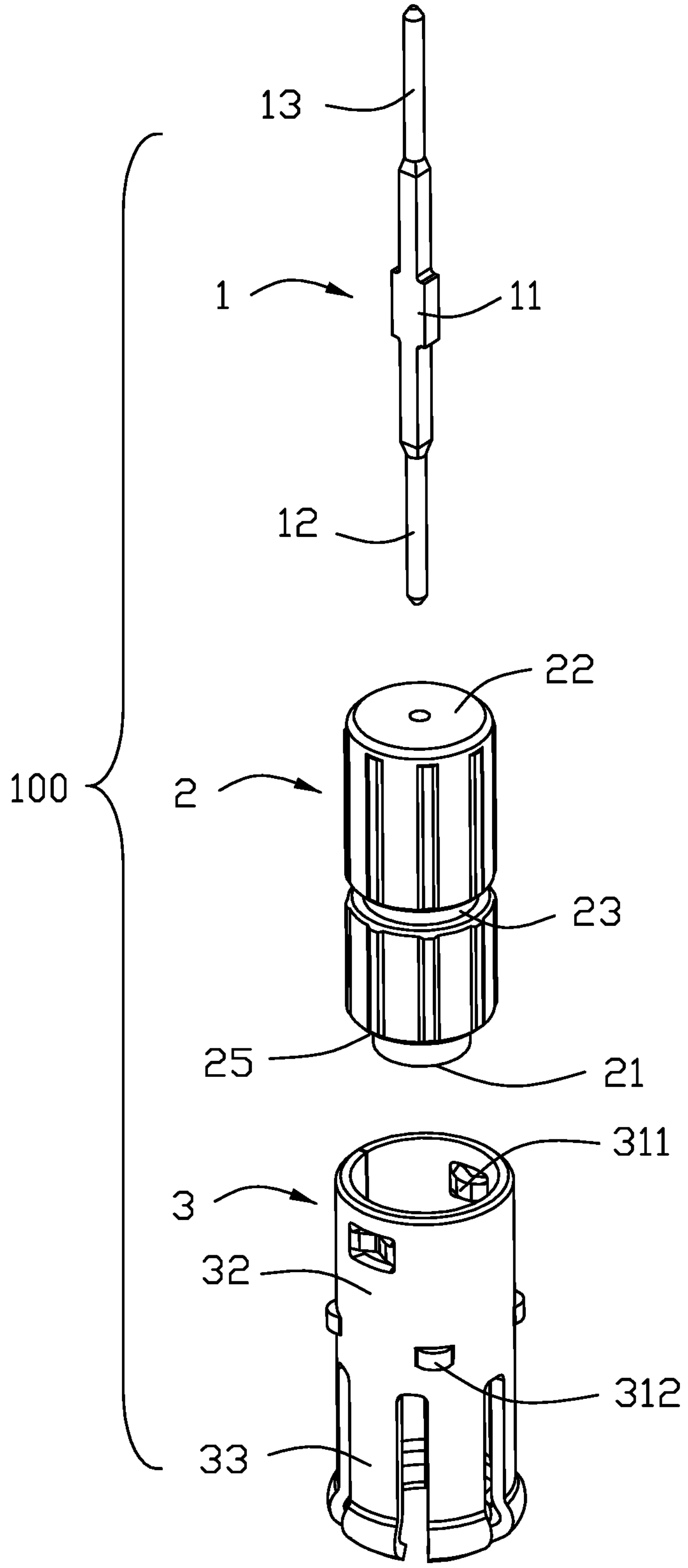
FIG. 8 is an exploded view of a connector of the electrical connector assembly.
Figure 9:
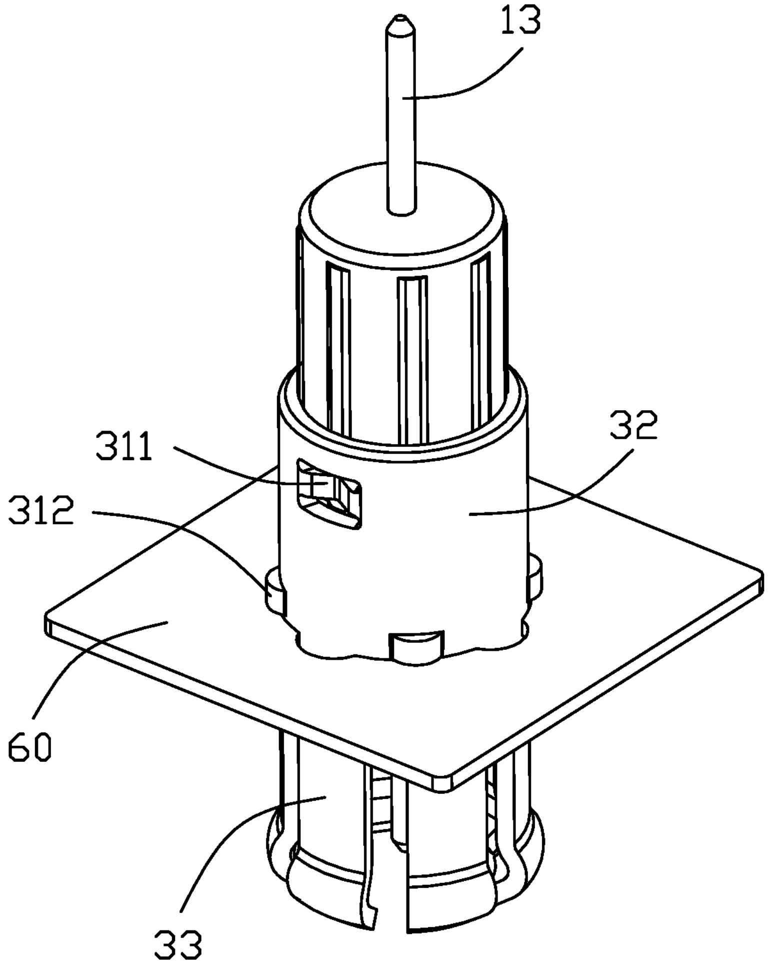
FIG. 9 is a perspective view of the connector in an assembled state.
Figure 10:
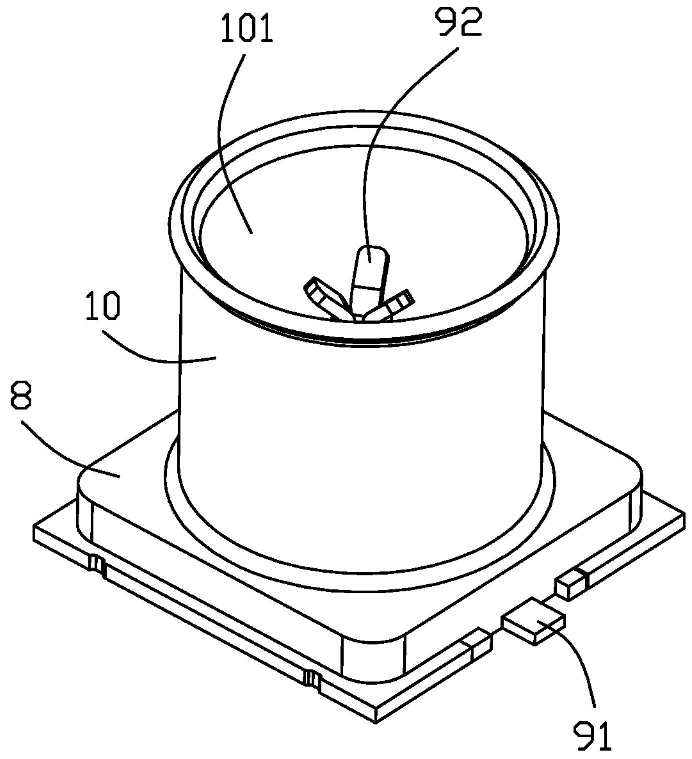
FIG. 10 is a perspective view of a module side connector of the electrical connector assembly.
Figure 11:
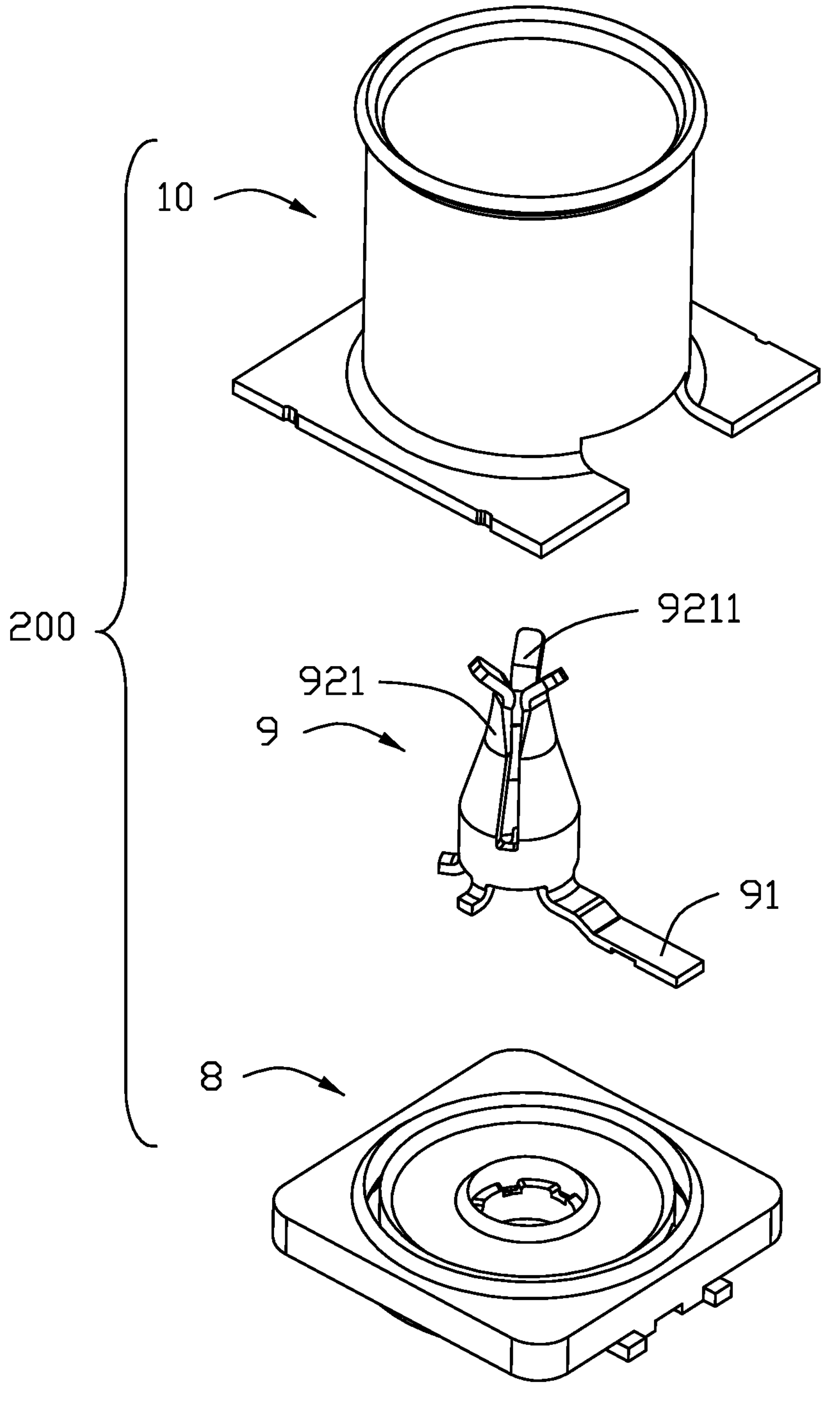
FIG. 11 is an exploded view of the module side connector.
Figure 12:
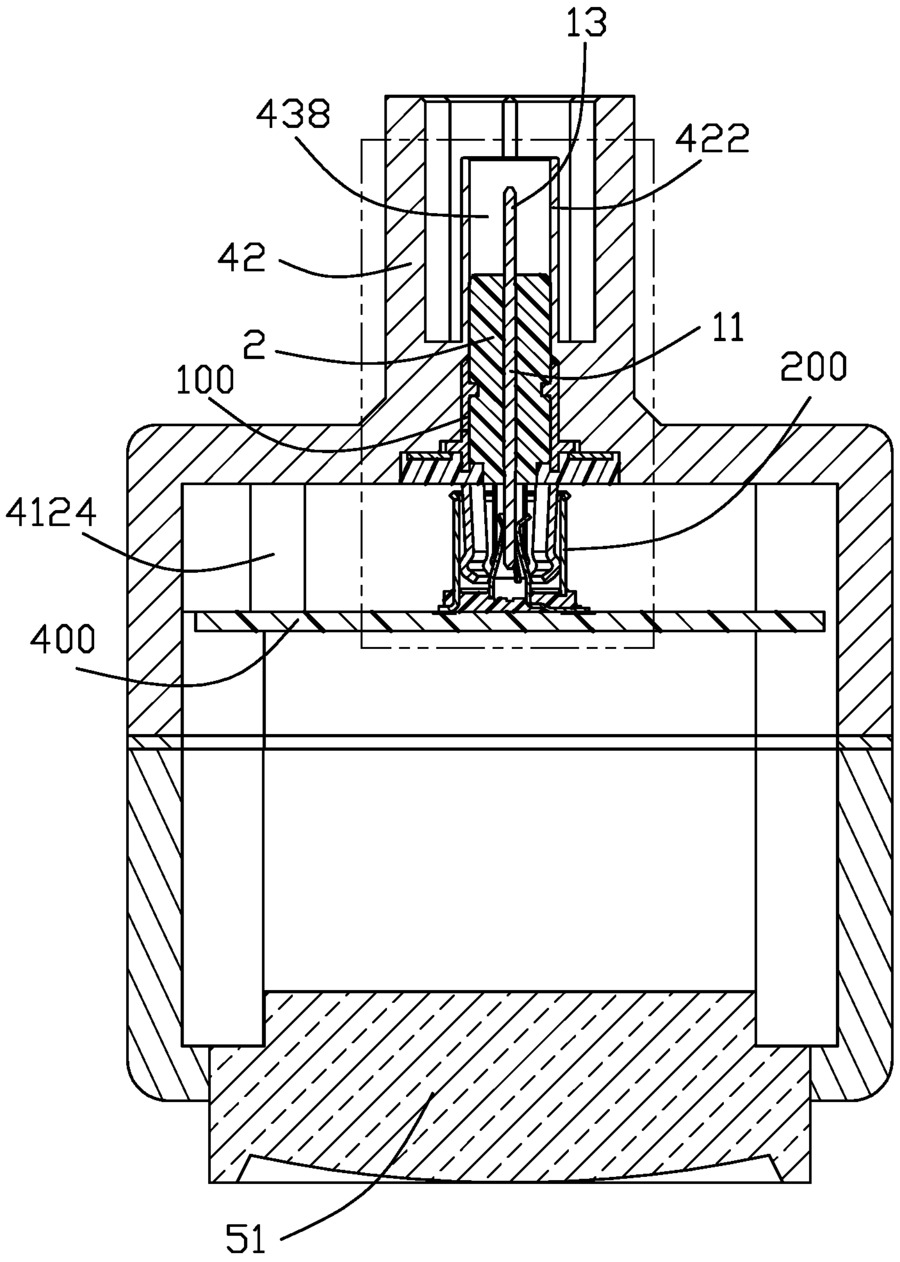
FIG. 12 is a cross-sectional view of the electrical connector assembly.
Figure 13:
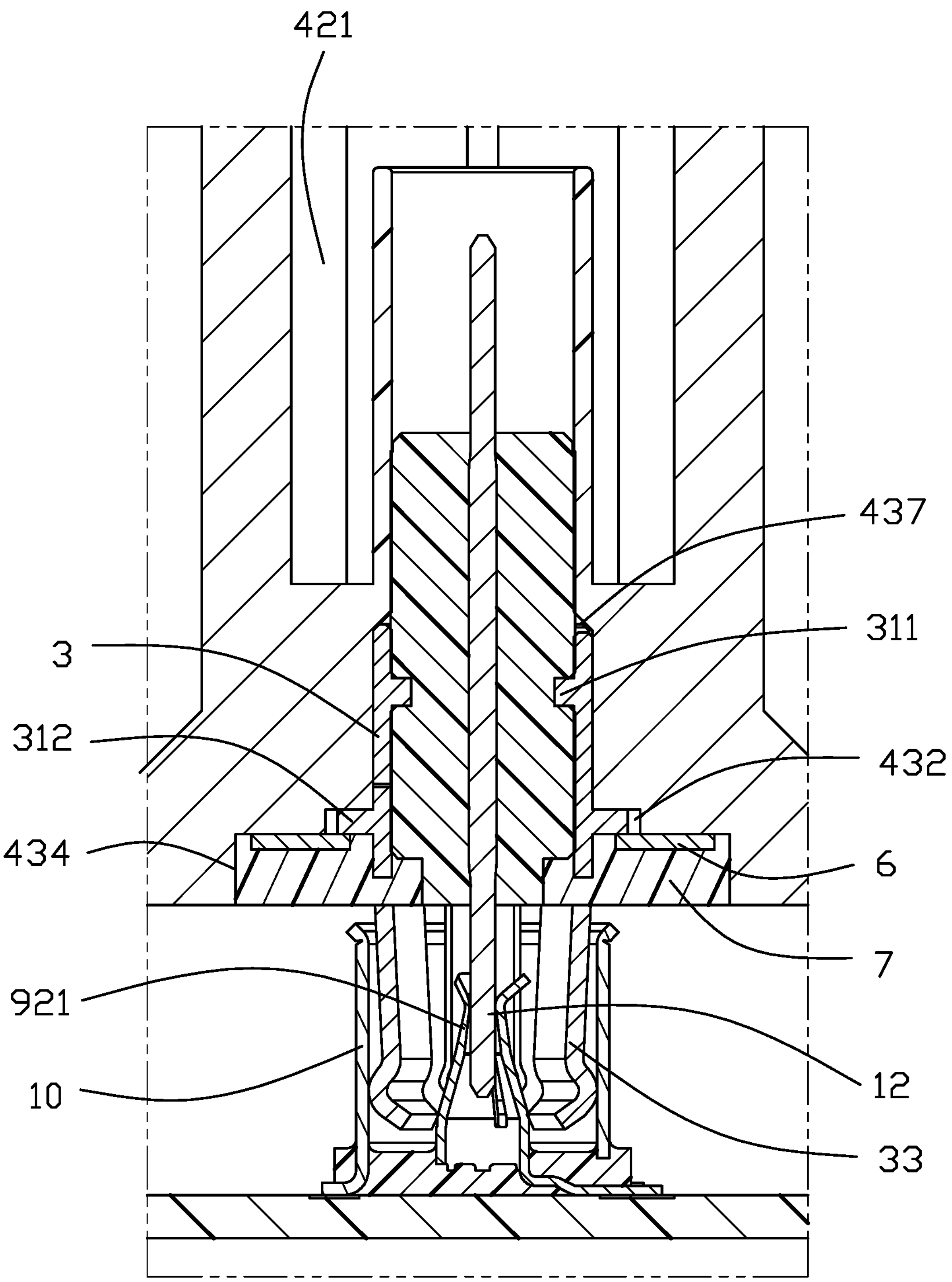
FIG. 13 is a partially enlarged view of FIG. 12.

Referring to FIGS. 8 and 9, the connector 100 has an insulating member 2, an inner conductor 1, and an outer conductor 3. The inner conductor 1 has a securing portion 11, a first contacting portion 12 extending beyond a front end face 21 of the insulating member 2, and a second contacting portion 13 extending beyond a rear end face 22 of the insulating member 2. The wall 31 of the conductor 3 has a pair of inward protrusions 311 and the member 2 has an annular groove 23 receiving the protrusions 311.

The housing 4 has a base 41, a body 42 extending rearward from the base 41, and a hole 43 through both the base 41 and the body 42. The hole 43 includes a first part 431 corresponding to the outer conductor 3 and having a first diameter, a second part 432 located in front of the first part 431 and having a second diameter greater than the first diameter, and a step portion 433 formed between the first part 431 and the second part 432. The wall 31 of the outer conductor 3 has a plurality of tabs 312 to be received in the second part 432 of the hole 43 with a respective rear end face of each tab 312 bearing against the step portion 433. In order to firmly secure the connector 100 to the housing 4, the electrical connector assembly 1000 includes a metal plate 6 enclosing the outer conductor 3. The metal plate 6 bears against respective front end faces of the tabs 312 and is then welded to the housing 4 which may be formed by metal injection molding. With the tabs 312 being securely retained between the metal plate 6 and the step portion 433, i.e., the tabs 312 are confined to the second part 432 of the hole 43, the connector 100 then is reliably secured to the housing 4. Specifically, each of the tabs 312 may be formed by a shearing operation to have the front and rear end faces and two side portions connected to the wall 31 of the outer conductor 3.

The hole 43 includes a third part 434 located in front of the second part 432 and having a third diameter greater than the second diameter of the second part 432, and a step section 435 formed between the second part 432 and the third part 434. A rear face 60 of the metal plate 6 is welded to the step section 435 so as to confine the tabs 312 to the second part 432 of the hole 43.

The outer conductor 3 of the connector 100 has a tubular body 32 and a plurality of front spring arms 33 surrounding the securing portion 11 of the inner conductor 1 to form a receiving chamber 320. The tabs 312 are located forwardly of the protrusions 311. The third part 434 of the hole 43 has a depth greater than that of the metal plate 6. The electrical connector assembly 1000 includes a sealing member 7 formed in the third part 434 to seal between the metal plate 6 and the connector 100, or to seal the metal plate 6 and a part of the connector 100. In this embodiment, the sealing member 7 also fills up a front annular recess 25 of the insulating member 2 of the connector 100.

The hole 43 further include a fourth part 436 located behind the first part 431 and a step 437 is formed between the fourth part 436 and the first part 431. The insulating member 2 of the connector 100 extends rearward beyond the outer conductor 3 and the inner conductor 1 extends further rearward beyond the insulating member 2. A rear end of the outer conductor tubular body 32 extends to the step 437 and both the insulating member 2 and the inner conductor 1 extend into the fourth part 436 of the hole 43. The body 42 of the housing 4 has an inserting chamber 438 and an inner cylindrical wall 422 extending rearward in the inserting chamber 438 and defining the fourth part 436 of the hole 43.

Referring to FIGS. 10-13, the module side connector 200 includes an insulating base 8, an inner conductor 9, and an outer conductor 10. The conductor 9 has a leg 91 soldering to a surface 401 of the substrate 400 and plural spring arms 921 defining an inserting space 9211. The outer conductor 10 surrounds the inner conductor 9 to define an inserting chamber 101.

The base 41 of the housing 4 has a main part 411 and a side portion 412 defining a receiving chamber 4121. The hole 43 extends through the main part 411 and the body 42. The side portion 412 has plural positioning corners 4122 in the receiving chamber 4121, plural notches 4123, and plural platforms 4124 for fastening the substrate 400 thereto. The substrate 400 has notches 402.

The invention claimed is:

1. An electrical connector assembly comprising:

a housing having a base, a body extending rearward from the base, and a hole through the base and the body, the hole including a first part of a first diameter, a second part of a second diameter greater than the first diameter, and a step portion between the first part and the second part;

a connector received by the housing, the connector having an insulating member, an inner conductor, and an outer conductor received by the first part of the hole, the outer conductor having a plurality of tabs received by the second part of the hole; and a metal plate confining the plurality of tabs to the second part of the hole.

2. The electrical connector as claimed in claim 1, wherein the metal plate presses the plurality of tabs against the step portion of the hole.

3. The electrical connector as claimed in claim 1, wherein the hole includes a third part and a step section between the second part and the third part thereof, and the metal plate is secured to the step section.

4. The electrical connector as claimed in claim 3, further comprising a sealing member formed in the third part of the hole.

5. The electrical connector as claimed in claim 1, wherein each of the plurality of tabs has a front face and a rear face in contact with the metal plate and the step portion of the hole, respectively.

6. The electrical connector as claimed in claim 1, wherein both the insulating member and the inner conductor of the connector extend rearward beyond the outer conductor.

7. The electrical connector as claimed in claim 1, wherein the body of the housing has an inserting chamber and an inner cylindrical wall extending rearward in the inserting chamber.

* * * * *